Feb. 1, 1938.  W. W. HARTMAN  2,106,949
BREAD SLICER FEED
Filed Aug. 24, 1936  8 Sheets-Sheet 1
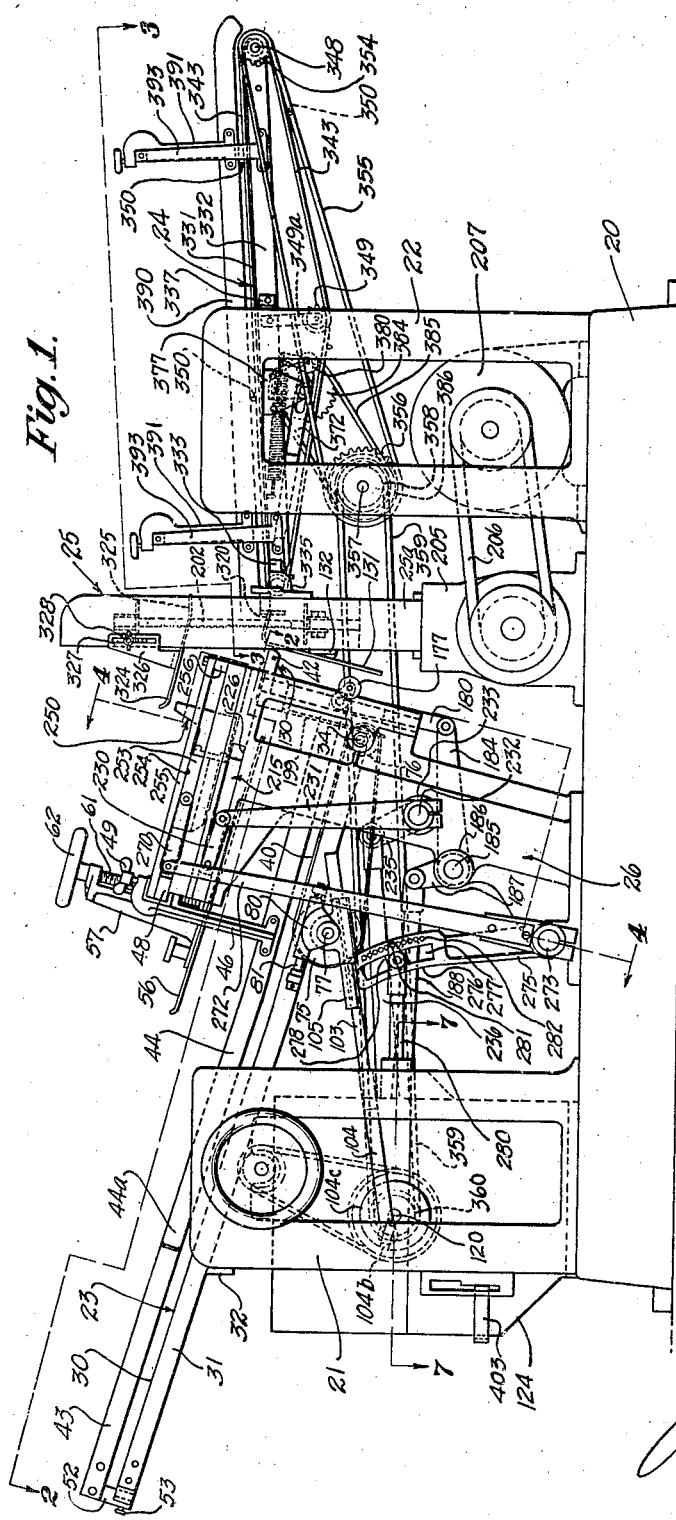
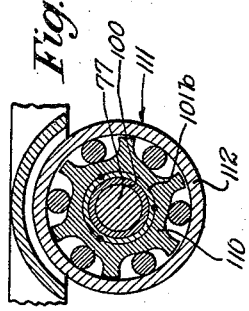
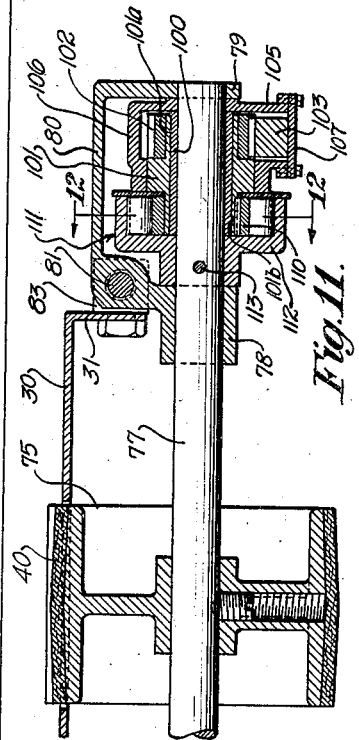
Inventor
William Walter Hartman.
Attorney.

Feb. 1, 1938.   W. W. HARTMAN   2,106,949
BREAD SLICER FEED
Filed Aug. 24, 1936   8 Sheets-Sheet 2

Inventor
William Walter Hartman.

Attorney.

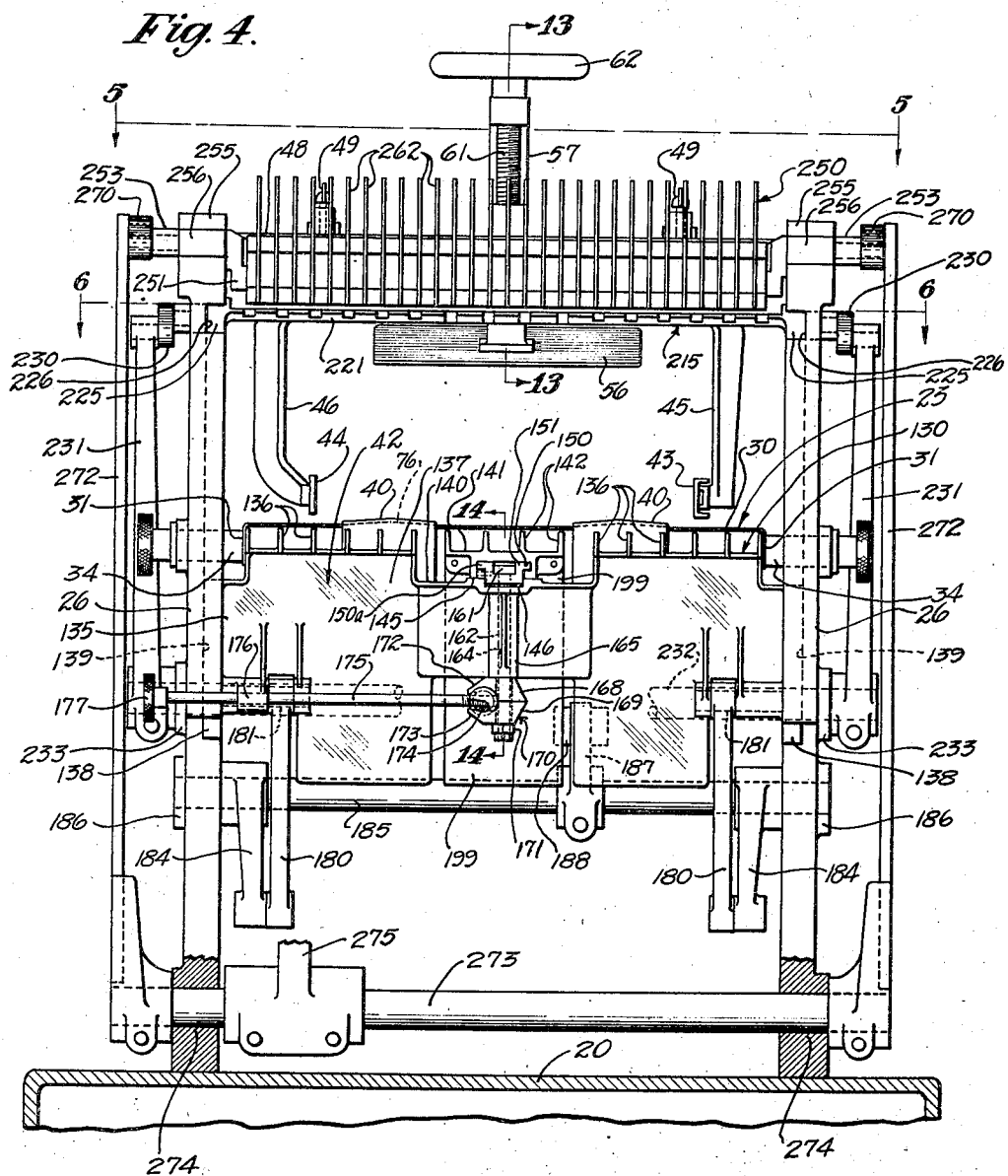

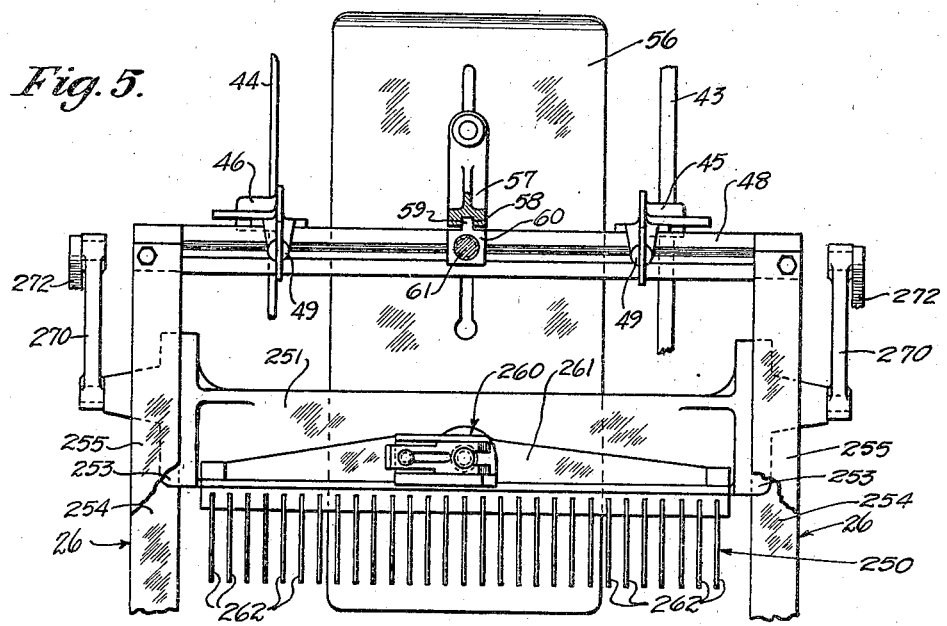
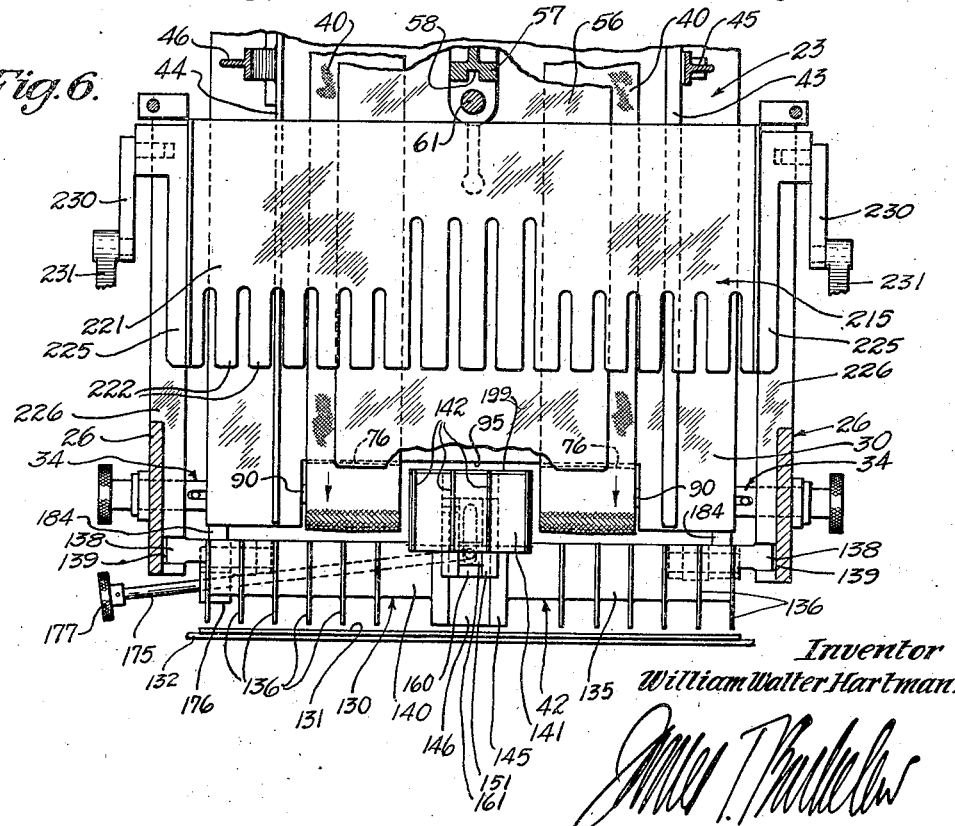

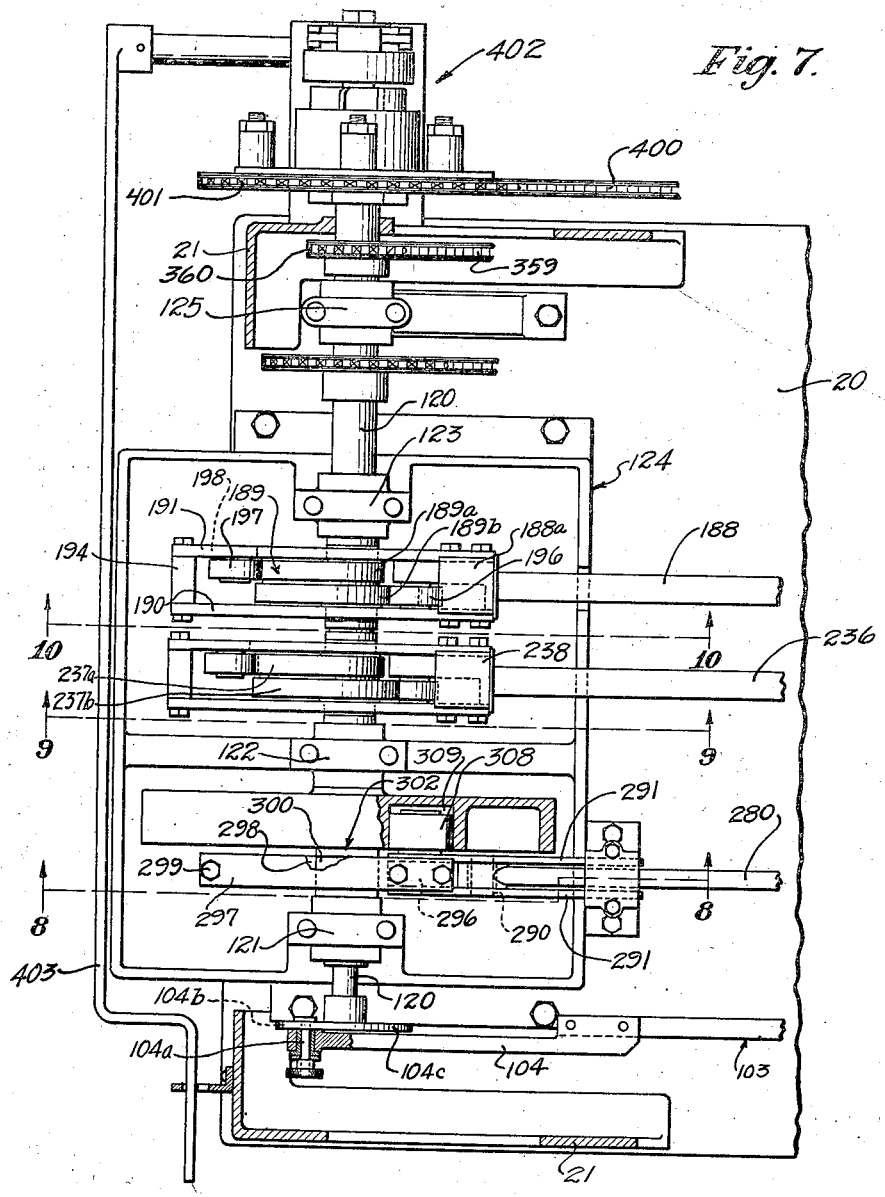

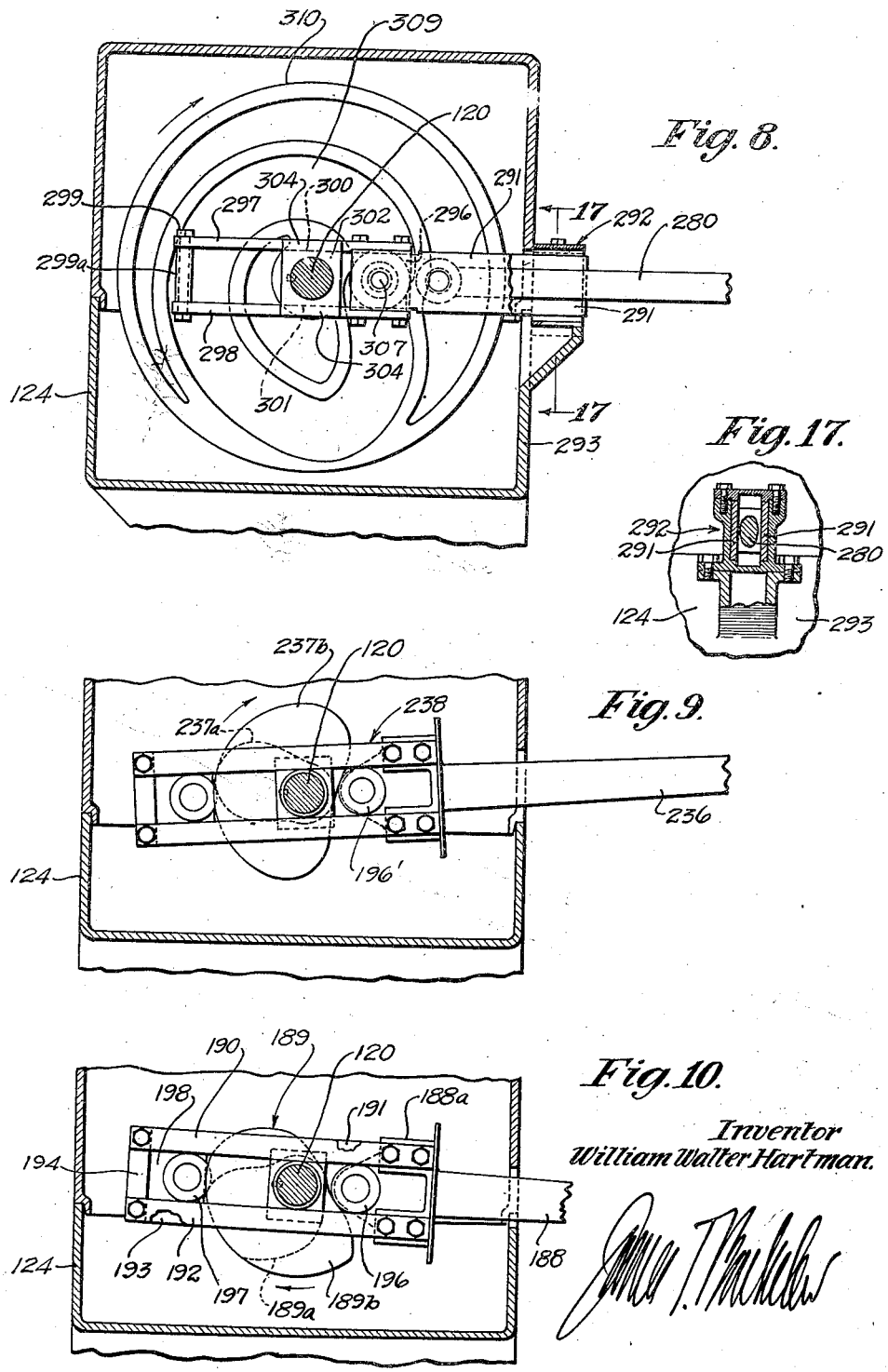

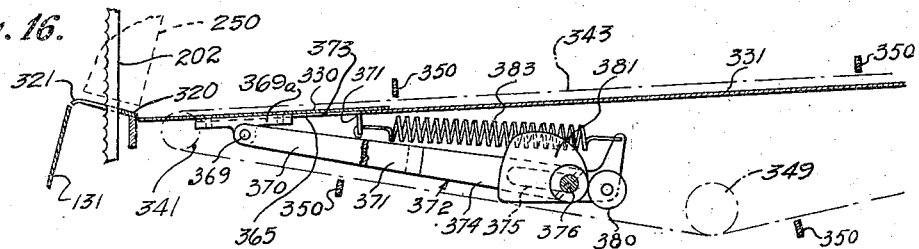
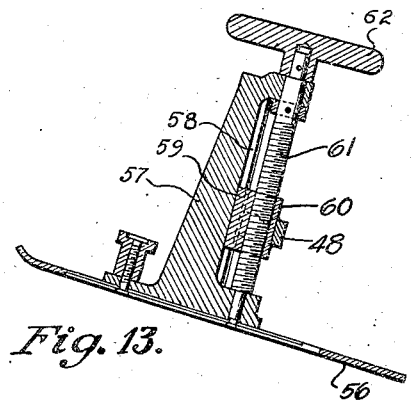
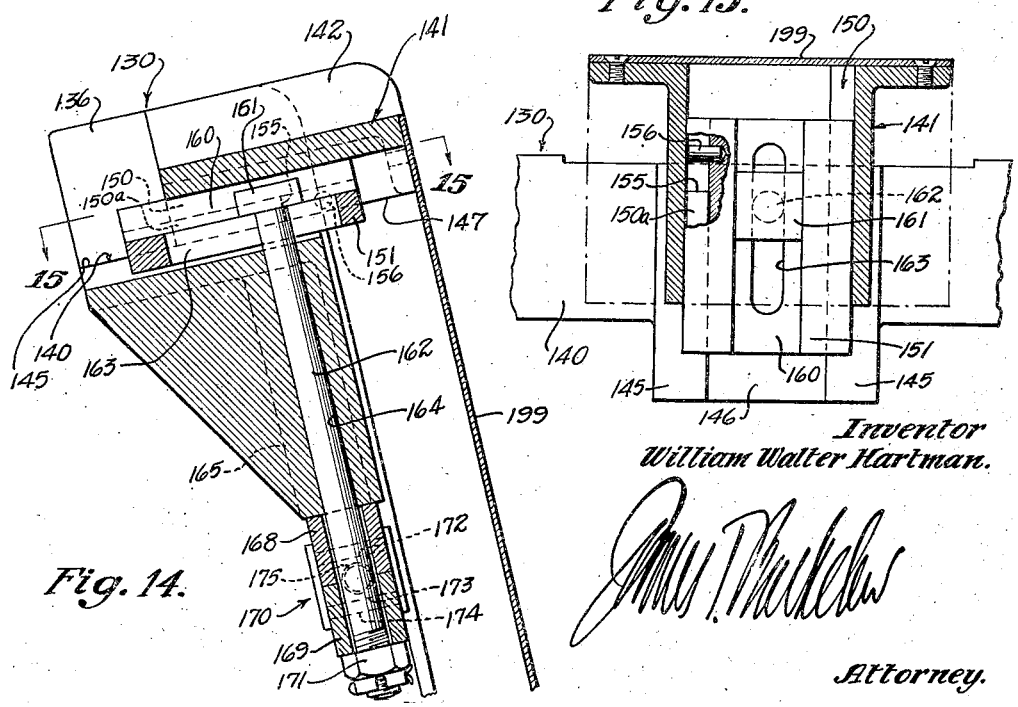

Feb. 1, 1938.　　　W. W. HARTMAN　　　2,106,949
BREAD SLICER FEED
Filed Aug. 24, 1936　　　8 Sheets-Sheet 8

Inventor
William Walter Hartman.

Attorney.

Patented Feb. 1, 1938

2,106,949

UNITED STATES PATENT OFFICE 2,106,949

BREAD SLICER FEED

William Walter Hartman, Los Angeles, Calif.

Application August 24, 1936, Serial No. 97,558

27 Claims. (Cl. 146—153)

This invention has to do with slicing machines, and more especially with feed means for slicing machines, particularly of the type adapted to slice loaves of bread.

The slicing mechanism of a bread slicing machine usually comprises a series of horizontally spaced knives moved longitudinally in a substantially vertical direction, and to and through which the loaves are fed by various types of feeding mechanisms. Feeding mechanisms as heretofore known, however, have involved various disadvantages, either relying upon the pressure of a row or stack of loaves one on the other to force the loaves through the knives, with resultant undesirable crushing of the loaves, which are still ordinarily in a fresh baked condition, and are consequently warm and soft, or involving positive feed devices for handling the loaves individually, but which are inefficient as regards time, and set a low limit on the operating capacity of the machine.

It is a general object of the present invention to provide an improved slicer feed mechanism which will move the loaves through the slicer knives by mechanical means acting on the loaves one at a time, and which is capable of handling fresh baked loaves without crushing or deforming them.

It is another object of the invention to provide a machine of this type having an infeed conveyor chute on which the loaves may be placed several at a time, rather than one at a time in separate conveyor pockets as must be done with the pocket type machine.

A further object of the invention is to provide a slicer feed mechanism in which an increased proportion of the cycle of the machine is devoted to slicing of the loaf, and which is therefore capable of relatively high output.

In accordance with the present invention, the loaves are initially placed on an infeed chute, preferably provided at its lower end with an intermittently advanced conveyor belt, which carries the loaves onto an elevator moving in timed relation with the conveyor belt. This elevator is in its lower position while the loaves are being advanced by the conveyor, and at such time receives a loaf from the conveyor. The loaf is then raised by the elevator to a position in front of the slicing knives. Immediately that the loaf reaches this latter position, a sustaining plate moves in beneath it, and the elevator then descends to receive the next loaf from the infeed conveyor. At the same time, a bread ram moves forwardly and engages the loaf and forces it through the knives, which cut the loaf into slices. The sliced load delivered from the knives is received by a suitable outfeed conveyor, which delivers it from the machine. The elevator, sustaining plate and bread ram are all operated in time relation by cams which are so designed as to allot a comparatively large share of the operating cycle to the slicing of the bread. Thus the bread ram moves slowly forward as it forces the bread through the knives, but has a quick return action once the loaf is forced clear of the knives. The elevator and sustaining plate are operated in such a manner as to place a loaf before this ram immediately that the ram is retracted. By thus devoting a large share of the cycle to cutting, and a small share of the cycle to return movement and to placing the next loaf in position before the ram, the speed of the machine in loaves per minute is improved without undesirably increasing the speed at which the loaves are moved through the knives, which is limited by the requirement of securing a clean cut.

These various features and accomplishments of my invention, as well as other objects and features not preliminarily mentioned, will be set forth in the following detailed description of a present preferred illustrative embodiment of the invention, reference for this purpose being had to the accompanying drawings, in which:

Fig. 1 is a side elevation of a machine embodying the present invention;

Fig. 4 is a transverse section taken as indicated by broken line 4—4 of Fig. 1, the view being taken, however, with the elevator in its lowermost position;

Fig. 5 is a view taken as indicated by line 5—5 of Fig. 4;

Fig. 6 is a section taken as indicated by line 6—6 of Fig. 4;

Fig. 7 is a horizontal sectional view of the cam box, taken as indicated by line 7—7 of Fig. 1;

Figure 2:
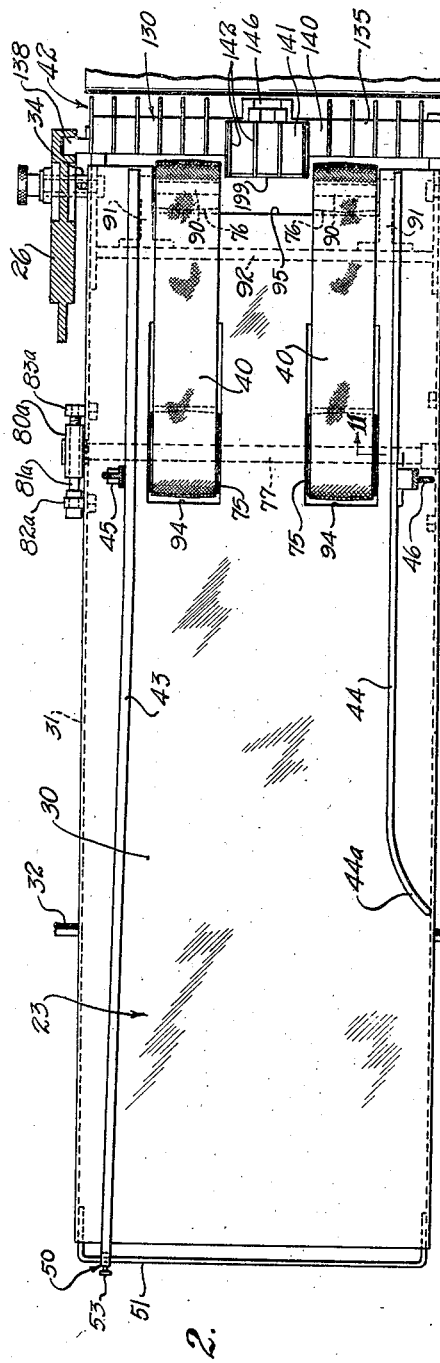
Fig. 2 is a plan view of the infeed conveyor, being taken as indicated by arrows 2—2 of Fig. 1.
Figure 3:
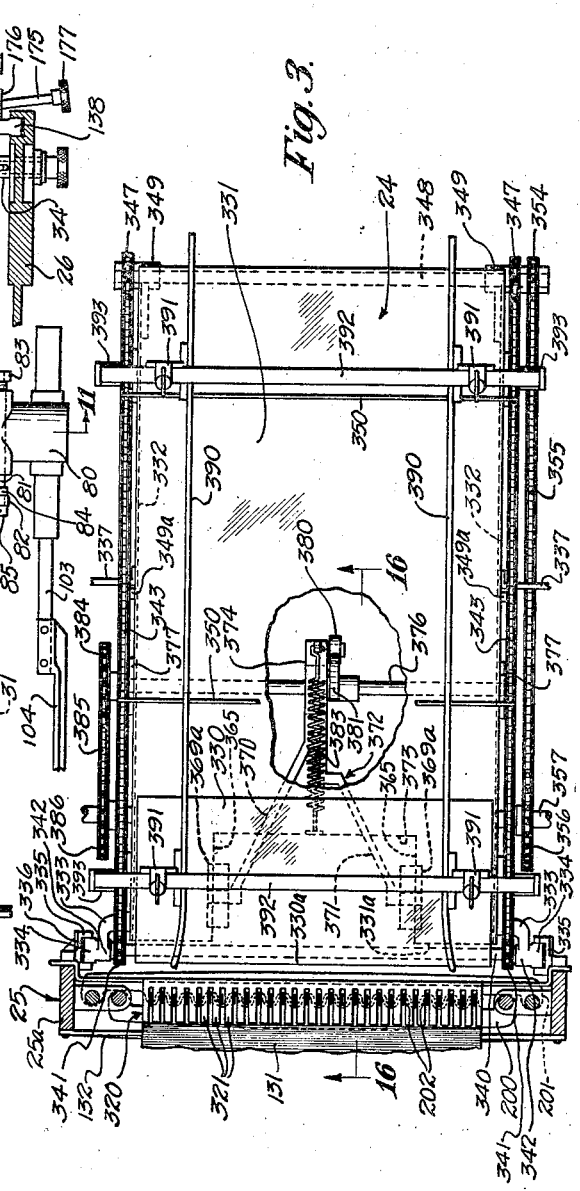
Fig. 3 is a plan view of the outfeed conveyor, being a view taken as indicated by arrows 3—3 of Fig. 1.

Figs. 8, 9, and 10 are vertical transverse sections taken through the cam box on lines 8, 9, and 10, respectively of Fig. 7;

Fig. 11 is a detail section taken as indicated by line 11—11 of Fig. 2;

Fig. 12 is a detail section taken as indicated by line 12—12 of Fig. 11;

Fig. 13 is a detail section taken as indicated by line 13—13 of Fig. 4;

Fig. 14 is a detail section taken as indicated by line 14—14 of Fig. 4;

Fig. 15 is a detail section taken on line 15—15 of Fig. 14;

Fig. 16 is a detail section taken on line 16—16 of Fig. 3, but showing the gap closing plate in gap closing position;

Fig. 17 is a detail section taken on line 17—17 of Fig. 8; and

Figure 18:
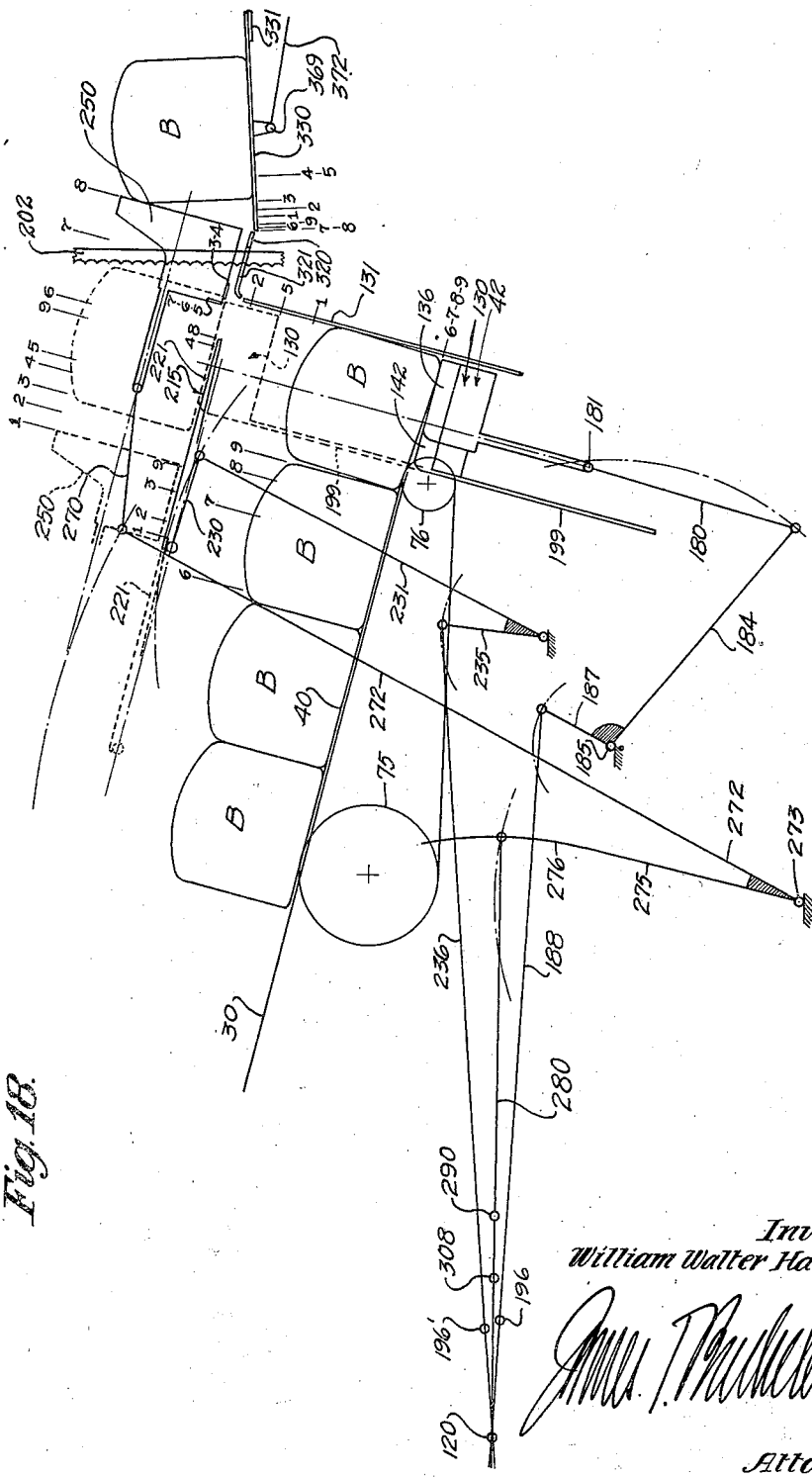

Fig. 18 is a timing diagram showing the machine diagrammatically and indicating corresponding positions of various members of the machine, these positions being arbitrarily selected and not representing equal time intervals of the operating cycle.

In the drawings numeral 20 designates generally the machine base which carries suitable main frame members, here illustratively shown to include, at opposite ends of base 20, upwardly extending end frame members 21 and 22, the former supporting the rearward end of the inclined infeed slide way or chute 23, and the latter supporting the outfeed conveyor generally designated at 24. A bread slicer mechanism 25 is supported by base 20 ahead of the outfeed conveyor, and certain mechanism for receiving the loaves of bread from the infeed chute and moving them through the slicing mechanism onto the outfeed conveyor is mounted on a pair of frame members 26 extending upwardly from opposite edges of base 20 between slicer mechanism 25 and end frame members 21.

The infeed chute 23, which is preferably, though not necessarily, of gravity type, being therefore inclined downwardly from its infeed end at such an angle as to cause the loaves to slide downwardly thereon, comprises typically a sheet metal plate 30 flanged downwardly at its side edges, as at 31, and supported near its infeed end by a frame cross-bar 32 carried by end frames 21, and at its opposite end by frame members 26 through any suitable supporting means such as indicated at 34 (see Fig. 2). The loaves of bread B are placed crosswise on infeed chute plate 30, as indicated in the diagram of Fig. 18, and slide downwardly by gravity onto a belt conveyor, consisting preferably of a pair of parallel conveyor belts 40 which extend longitudinally of the chute for a distance at its lower end. While I have shown the belt conveyor as comprising two parallel belts, it will be obvious that a single belt conveyor might be substituted, if desired. These belts rise just above the surface of plate 30 (see Figs. 2 and 11), and serve to carry the loaves off the end of plate 30 and to deposit them onto an elevator 42, as later to be described in more detail.

The inclination of the top sides of these belts 40 is preferably less than the sliding angle of the loaves on the belts, being in the present instance substantially 14° with horizontal. Preferably, the infeed chute ahead of the beginning end of conveyor belts 40 is inclined at an angle somewhat steeper than the inclination of the belts, as clearly indicated in Fig. 1 of the drawings. Thus, while the belts and the lower portion of the chute may be disposed at a typical angle of substantially 14° with horizontal, the portion of the chute ahead of the belts is preferably inclined at a somewhat steeper angle, so that the loaves will readily slide down the chute and onto the belts. Moreover, while the lower portion of the chute and the conveyor belts are here shown at an inclination of substantially 14° with horizontal, it is not essential that this extent of inclination be maintained, it obviously being feasible to reduce this inclination, or to run the belts in a substantially horizontal direction. On the other hand, it will be apparent that in simple forms of the machine the belt conveyor may be omitted, the chute being disposed at sufficient inclination throughout its length that the loaves will slide all the way onto the elevator. When the belt conveyor is used, its chief function is to move the last one or two loaves off the chute, which will not slide off the chute without a stack of loaves backing them up. Except for this, the machine operates satisfactorily without the belt conveyor, which is therefore not to be considered essential to the machine, even though it serves a very useful purpose when employed.

For the purpose of the specification and claims, the expression feed means, or means for feeding a loaf, will be used in a generic sense to denote the means which delivers the loaves onto the elevator, later to be described, whether or not a conveyor belt is employed, and whether or not the loaf slides down an inclined chute.

The loaves sliding down chute 23 have their ends guided by side rails 43 and 44, carried by hangers 45 and 46, respectively. The upper ends of these hangers are slidable on a horizontal transverse frame bar 48, mounted on frame members 26, and are adapted to be clamped in adjusted position by means of clamp screws 49 which are adapted to be set up against bar 48. Thus by adjustment of these hangers on bar 48, the positions of the side rails 43 and 44 may be regulated to take loaves of various lengths. In the illustrative form of the machine, the rail 43 at the rearward edge of the chute extends the length of the chute, and is provided at the forward end of the chute with a slidable mounting 50 on a supporting bar 51 mounted on the end of the chute. For instance, the end of rail 43 may be provided with a downwardly extending mounting member 52 which slidably engages transverse bar 51, and which is provided with a set screw 53 adapted to be set up against bar 51 (Figs. 1 and 2). In the embodiment here shown, rail 43 inclines inwardly from the infeed end of the chute substantially the point at which the loaves are picked up by the conveyor belts 40, and from that point is parallel to the conveyor belts.

The beginning end of side rail 44 is located somewhat down the chute, as indicated in Figs. 1 and 2, so as to permit the loaves of bread to be conveniently placed on the chute from that side of the machine, which is the side of the machine on which the operator stands. This rail 44 is provided at its infeed end with an inwardly curved guide portion 44a, adapted to guide the loaves into proper position on the chute.

The chute is also provided with a hold down plate 56 disposed over the upper surfaces of the loaves, and this hold down plate is adjustable to loaves of various heights. As here typically shown, this plate 56 is secured to the underside of a bracket or hanger 57 which is adjustable on a line at right angles to the chute. Bracket 57 is provided with a groove-like way 58 adapted to slidably receive and be guided by a tongue 59 formed on a block 60 mounted on the upper side of the aforementioned frame bar 48 (Figs. 5 and 19). Journalled for rotation in the upper and lower ends of bracket 57, but confined against endwise travel relative thereto, is a lead screw 61 which has screw threaded engagement with block 60. A hand wheel 62 on the upper end of screw 61 enables said screw to be rotated, causing the screw, as well as bracket 57 and hold down plate 56, to be moved up or down as required.

The previously mentioned conveyor belts 40 travel over forward and rearward rollers 75 and 76, respectively. As here typically shown, forward rollers 75 are tightly mounted on a horizontal shaft 77 journalled at one of its ends in bearings 78 and 79 provided in a housing member 80, and at its other end in similar bearings provided in a housing member 80a. Housing 80 is screwthreadedly mounted on a pin 81 which is disposed parallel to the conveyor belts, and which is mounted for rotation in lugs 82 and 83 secured to the down turned flange 31 at one edge of the chute. Pin 81 has a collar 84 adjacent one side of lug 82, and has a head 85 on its end adjacent the other side of said lug. This head 85 is adapted to be rotated to rotate lead screw pin 81 and thereby cause translation of housing 80 parallel to the conveyor belts. Housing 80a which journals the other end of shaft 77 is similarly mounted on a lead screw mounting pin 81a mounted parallel to the conveyor belts in lugs 82a and 83a. It will be evident that rotation of these lead screw mounting pins 81 and 81a will effect movement parallel to the conveyor belts of housings 80 and 80a which journal the ends of roller shaft 77, and will thereby regulate the tension of the belts 40 passing over said rollers.

The belt rollers 76 at the other ends of the belts are mounted on horizontal shafts 90 journalled in brackets 91 carried by a cross frame member 92, which may be secured in any suitable manner to the infeed chute.

Plate 30 of the infeed chute is provided with apertures 94 to accommodate rollers 75 and the belts 40 passing thereover. These belts 40 move forwardly from rollers 75 just slightly above the surface of plate 30 to rearward rollers 76. The rearward end of plate 30 of the chute is notched at 95 to accommodate rollers 76, as clearly shown in Fig. 2.

The loaves of bread sliding downwardly by gravity on chute 23 move onto the parallel conveyor belts 40, which are operated intermittently to advance the loaves. Typical and present preferred means for intermittently advancing the belts will now be described.

Rotatable on shaft 77 within housing 80 is a bearing sleeve 100 (see Fig. 11), on which is tightly mounted a bushing 101. The outer end of bushing 101 is reduced, as at 101a, and tightly mounted thereon is a spur pinion 102. Meshing with the bottom side of pinion 102 is a rack gear 103, which is on the end of a reciprocating crank driven arm 104 (see Figs. 1 and 7). The reciprocating rack 103 is slidable in a guide member 105 which forms a part of a rock member 106 rotatably mounted on shaft 77 and on bushing 101 within housing 80, the rack being held in position in mesh with pinion 102 by means of a removable bottom plate 107 secured to the lower side of guide member 105. Guide member 105 is thus mounted for pivotal movement on an axis concentric with that of the pinion 102 with which the rack 103 is in mesh, and thus accommodates vertical swinging action of crank driven arm 104 and rack 103.

Keyed on the reduced end 101b of bushing 101 is the spider or driving element 110 of a roller ratchet clutch 111. The driven element 112 of this clutch is made fast on shaft 77, as by means of pin 113. Clutch 111 has such characteristics as to drive shaft 77 when its drive element 110 is rotated in a right-handed direction, as viewed in Fig. 12, but to release shaft 77 and allow it to remain stationary when the drive is in the reverse direction of rotation. Thus it will be evident that upon each forward movement of reciprocating arm 104 and ratchet bar 103, clutch member 110 rotates left-handedly without driving shaft 77, and rollers 75 and conveyor belts 40 remain stationary, while during each rearward movement of reciprocating arm 104 and ratchet bar 103, clutch member 110 rotates right-handedly and the ratchet clutch engages and drives shaft 77 in a right-handed direction, rotating rollers 75 and advancing conveyor belts 40.

The reciprocating driving arm 104 is driven by a crank pin 104a adjustably mounted in a radial slot 104b formed in a crank disk 104c mounted on one end of a horizontal transversely extending main drive shaft 120. This main drive shaft is journalled in three bearings 121, 122, and 123 supported within a crank case 124 mounted on machine base 20 between end frame members 21, and also by an outboard bearing 125 mounted on base 20 (Fig. 7). This main drive shaft 120 is driven in a manner later to be described.

It will be evident that the rotating drive shaft 120 will act through crank disk 104c and crank pin 104a to reciprocate driving arm 104 and rack 103, and that the limits of the stroke will be determined by the setting of crank pin 104a with reference to the center of the crank disk. It has previously been described how the conveyor belts 40 are advanced on each back stroke of arm 104 and rack 103 (to the left in drawings), and remain stationary during each forward stroke of said arm and rack. Crank pin 104a is so adjusted with reference to the axis of the crank disk that the conveyor belts 40 are advanced by a distance equal to the width of one loaf each rearward stroke of drive arm 104 and rack 103. Thus the mechanism described comprises broadly a means for intermittently advancing the loaves in the conveyor chute a distance equal to one loaf-width at a time, which distance is adjustable to correspond with the widths of different types of loaves. While the present illustrated conveyor belt mechanism is crank driven, it will be obvious that other forms of drive may be substituted, if desired. With a crank driven mechanism, however, the conveyor belts are advanced with harmonic motion through substantially 180° of rotation of the main drive shaft of the machine.

The loaves move forwardly from the ends of conveyor belts 40 onto an elevator 130 which is in its lowermost position (see Fig. 18) while the conveyor belts are travelling forwardly. The upper or bread carrying surface of the elevator, onto which the loaf is moved, is parallel to but at this time slightly below the top surface of conveyor belts 40, and is therefore, in the preferred form of the machine, inclined downwardly at substantially 14°. The loaf so moved onto the elevator comes against a stationary stop plate 131 which is positioned to the rear of the elevator and is mounted substantially at right angles to conveyor belts 40. This stop plate 131 may be supported on the machine in any convenient manner, as for instance by means of a mounting 132 on the frame 25a of slicer mechanism 25.

Elevator 130 comprises a cross head 135 provided with a series of horizontally spaced, upstanding bread supporting plates or flanges 136 or the equivalent, these plates extending parallel to the longitudinal direction of travel of the bread through the machine. The upper edges of these plates define the upper bread carrying surface or plane of the elevator, which, as previously stated, is parallel to downwardly inclined conveyor belts 40 and stands at an elevation slightly below said belts when the elevator is in its lowermost position (Fig. 18). Extending downwardly from cross head 135, at right angles to the bread supporting plane defined by the upper edges of plates 136, and therefore also at right angles to the inclined infeed conveyor belts, is a web 137, the two opposite edges of which are formed with slide members 138 (see Fig. 6) adapted to slide in opposed guideways 139 formed in frame members 26, these guideways 139 being disposed substantially at right angles to conveyor belts 40. Elevator 130 is thus movable up and down in guideways 139 on a direction line inclined somewhat from vertical, in the present instance, at 14° from vertical. It will be understood, however, that the up and down travel of the elevator is preferably substantially at right angles to the top sides of conveyor belts 40, or of the lower portion of the chute, if the belts are omitted, and that if the elevator travels in a substantially vertical direction, the belts will preferably move in a substantially horizontal direction.

Bread supporting plates are preferably slightly less in length than the width of a loaf of bread, and the loaf overhangs said plates at the rear. To support the rearward portion of the loaf, and to accommodate loaves of different widths, the following typical provisions are preferably made. The crosshead of the elevator is cut away in the center, as at 140, and a forwardly and rearwardly adjustable member 141, provided at the top with bread supporting plates 142, similar to plates 136 on cross head 130, is mounted in the space so provided. These plates 142 are adapted to support the rearward overhanging portion of the loaf in the center. To provide for support of member 141, the cross head is formed with a horizontal surface 145 cut with a longitudinally extending way 146. The underside 147 of member 141 is slidable on surface 145, as indicated in Fig. 4. Member 141 is formed with a T-shaped slot or way 150, which opens through its lower surface 147, as indicated in Fig. 4, and coincides with the previously mentioned guideway 146. Slidably mounted in said way 150 is a complemental block 151, the lower portion of which is slidably received within guideway 146. It will be evident that block 150 is slidable on the elevator cross head, and that supporting member 141 is slidable on block 150, the arrangement thus providing for what may be described as a telescopic extension of said members to such a position as is illustrated in Fig. 6, for instance, to accommodate a wide loaf size.

Extension of supporting member 141 with reference to block 150 is preferably limited. This is accomplished in the present instance by terminating guideway projection 150a to provide a shoulder at 155 (Fig. 15), and providing the side of block 151 with a stop pin 156 adapted to be engaged by said shoulder when the maximum desired extension of member 141 with reference to block 150 has been reached.

Means are provided for adjustably clamping member 141 to block 151 and to the cross head of the elevator. The upper side of block 151 is formed with a longitudinal guideway 160, and received therein is the square head 161 of a downwardly extending bolt 162 which passes through longitudinal slot 163 in block 151 and through a vertical bore 164 in elevator boss 165. Below the lower end of boss 165 this bolt 162 extends through two members 168 and 169 of a clamp device 170, and has fast on its lower end, below member 169, a nut 171. Members 168 and 169 are formed with jaws 172 and 173, respectively, inclined toward one another, as illustrated, and received in the space between said jaws is a cylindrical member 174 into which is screwthreaded the end of a manual adjustment shaft 175, this shaft being journaled in a bearing on the elevator at 176 and having on its outer end a manual operating knob 177. It will be evident that rotation of shaft 175 by means of knob 177 will advance or withdraw cylinder 174 with reference to clamp jaws 172 and 173, so that movement of cylinder 174 to the left (Fig. 4) will spread the jaws apart. And it will be evident that as the jaws are so spread apart, clamp member 169 will be moved downwardly and will draw clamp bolt 162 downwardly to clamp bread supporting member 141 and block 151 tightly to the cross head of the elevator. Thus the bread supporting member 141 is adjusted to proper position for any given loaf size by first releasing it for adjustment movement by turning knob 177, then sliding it and block 151 to the necessary position, and thereafter tightening the parts by turning knob 177 in the reverse direction.

In the present illustrative embodiment of the invention, the elevator is reciprocated between its extreme lower and upper limits (see Fig. 18) in synchronized relation with operation of the conveyor belts 40 that deposit the loaves onto the elevator by the following typical and preferred mechanism. A pair of links 180 are pivotally connected at their upper ends to elevator web 137, as at 181, and are pivotally connected at their lower ends to crank arms 184 mounted on a shaft 185 journaled at 186 in frame members 26. Also mounted on shaft 185 is an upwardly extending crank arm 187, the upper or swinging end of which is pivotally connected to a connecting rod 188 operated by a cam member 189 on main drive shaft 120 (see Figs. 7 and 10). On the rearward end of connecting rod 188 is a head 188a, on which are mounted two parallel upper bars 190 and 191, and two parallel lower bars 192 and 193 below upper bars 190 and 191, respectively, said bars being connected at their rearward ends by an end member 194. These bars provide a follower frame for the aforementioned cam member 189. In the present illustrative form of the invention, cam member 189 comprises two cam elements 189a and 189b keyed side by side on main drive shaft 120. Cam element 189b rides on a follower roller 196 carried by head 189, while cam element 189a rides on a follower roller 197 carried by a supporting member 198 secured, as by welding, between upper and lower bars 191 and 193. The outlines of cam elements 189a and 189b are complemental to one another, so that cam element 189a bears constantly against follower roller 197 while cam element 189b bears constantly against follower roller 196.

The elevator is in its lowermost position when connecting rod 188 is in its forward position, and is elevated toward its uppermost position when rod 188 is moved in a rearward direction, or to the left as viewed in the drawings. In the present illustrative embodiment of the invention, cam elements 189a and 189b are so designed that the elevator dwells in its lowermost position for substantially 142° of rotation of drive shaft 120, rises through substantially 62° of drive shaft rotation, dwells in its uppermost position for substantially 42° of drive shaft rotation, and descends through substantially 114° of drive shaft rotation. The elevator driving cams are placed on the main drive shaft with such angular reference to crank pin 104a that drives the drive arm 104 for conveyor belts 40 that the elevator begins to rise as soon as a loaf has been deposited thereon by said belts 40. In order to insure that the loaf on the end of conveyor belts 40 will not by any change fall off the ends of said belts while the elevator is up, the elevator is preferably provided with an apron 199, which as here typically shown extends downwardly parallel to the direction of elevator movement from the end of adjustable elevator extension member 141. This apron is received in the space between belts 40 where said belts go downwardly around rollers 76 (see Fig. 2), and guards against the loaves falling from off said belts while the elevator is up.

The loaf next behind the loaf that is being lifted by the elevator is prevented from being overturned by the elevating loaf by the previously described hold down plate 56.

A loaf moved onto the elevator and elevated thereby to the extreme upper position indicated in dotted lines in Fig. 18 is in position before the row of bread slicing knives 202 of cutter mechanism 25. This cutter mechanism may be of any usual or approved type involving horizontally spaced substantially vertically moving bread slicing knives. The cutter mechanism here indicated is of a conventional type involving a pair of vertically guided knife supporting frames 200 and 201 (see Fig. 3), the two frames carrying alternate knives, and being vertically reciprocated in 180° opposition to one another by suitable drive mechanism housed within case 205 mounted on main frame base 20, said mechanism being driven through belt 206 from electrical motor 207 also mounted on base 20. The details of the cutter mechanism and its drive form no part of the present invention and will not be here described in detail, since such cutter mechanisms are well understood in the art.

The loaf having been carried by the elevator to the extreme upper position indicated in Fig. 18, a sustaining member 215 next moves forwardly under the loaf to sustain it in elevated position while the elevator is returning in a downward direction to receive the next loaf. This sustaining member comprises a plate 221 slotted along its forward edge to provide horizontally spaced forwardly projecting fingers 222 adapted to move in between the upstanding bread supporting plates 136 of the elevator. This plate is formed with enlarged slide portions 225 which are received within and guided by ways 226 formed in frame members 26 in a direction preferably substantially at right angles to the direction of elevator travel. As a preferred means for moving this sustaining member 215, there are pivotally connected to slide portions 225 of plate 221 a pair of links 230, which are in turn pivotally connected to the upper ends of lever arms 231 mounted on a transverse shaft 232 journalled in frame parts 26, as at 233. Also mounted on shaft 232 is an upwardly extending crank arm 235 to which is connected a connecting rod 236 extending within crank case 124 and operated by a cam member consisting of complemental cam elements 237a and 237b. Connecting rod 236 carries a cam follower frame 238 which may be exactly like that described for connecting rod 188, and which will therefore not be described in detail. In the present illustrative form of the invention, cam elements 237a and 237b are so designed that the bread sustaining plate 221 moves forwardly or towards the elevator during substantially 96° of drive shaft rotation, dwells in its forward position for 168° of drive shaft rotation, and returns in a rearward direction during substantially 96° of drive shaft rotation. Cam elements 237a and 237b are so angularly related to the cam members that drive the elevator that sustaining plate 221 begins to move forwardly substantially 35° of drive shaft rotation after the elevator starts to move in an upward direction, and are so designed that the fingers 222 of said plate 221 do not reach the elevator until after the loaf has been raised by the elevator to an elevation slightly above the plane of movement of the sustaining plate 221, thus avoiding interference between the sustaining plate and the loaf. As the loaf moves above that elevation, however, plate 221 quickly moves forwardly beneath the loaf, its projecting fingers 222 moving in between the upstanding supporting plates 146 of the elevator. When the elevator then moves downwardly, the loaf engages and is sustained by the fingers 222 of this sustaining plate 221. The sustaining plate then remains in such position until after the loaf has been moved forwardly through the knives of the cutter mechanism, when it is quickly returned to retracted position to allow the elevator to rise with the next succeeding loaf.

The loaf moves forwardly on the sustaining plate toward and through the knives. The upper surface of the sustaining plate may therefore be considered as defining the slicing level or plane of the machine.

Preferred means for moving the loaves through the knives of the cutter mechanism will now be described. A reciprocating ram 250 is provided over sustaining plate 221, and is adapted to be moved in a forward direction to engage the flat side of a loaf resting on said plate 221 and move it through the substantially vertically moving knives 202 of cutter mechanism 25. This ram which is preferably movable in a direction substantially at right angles to the direction of movement of elevator 139, and therefore parallel to the direction of movement of bread sustaining plate 221, in its present illustrative form comprises a cross head 251 which is slidably received between the upper portions of frame members 26, and which is provided with outwardly projecting guide portions 253, slidably received within guideways or slots 254 formed between the upper edges of frame portions 26 and guide bars 255. These guide bars 255 are mounted at one end on the previously described cross frame bar 48, and at the other end on mounting blocks 256 mounted on the upper end of frame members 26. These guideways or slots 254 are formed in a direction parallel to the guideways 226 for the bread sustaining plate 221, as clearly appears from Fig. 1.

Mounted on cross head 251, as by means of a releasable mounting of any suitable type, such as indicated at 260 (Fig. 5), is a mounting member 261 carrying forwardly projecting horizontally spaced vertical plates 262, which are so spaced as to be movable in between knives 202 when the ram is advanced to move the bread through the cutter mechanism. After the loaf has been deposited on sustaining plate 221 by the elevator, this ram advances, engaging the loaf and moving it forwardly against and through knives 202, the plates 262 of the ram moving in between the knives during the last part of its stroke to push the bread entirely clear of the cutter mechanism. The ram operates between the limiting positions indicated in Fig. 18.

As here typically illustrated, the ram is operated through links 270 pivotally connected to the outer ends of its guideway projections 253, links 270 being pivotally connected to the upper ends of long lever arms 272 mounted on a shaft 273 journalled at 274 in frame members 26 just above machine base 20. Rigidly mounted on shaft 273 is a swinging arm 275 having a curved upper end 276. The curved upper end of arm 275 has an arcuate slot 277 in which is received a guide block 278, and pivotally connected to guide block 278 is the forward end of a connecting rod 280 which extends within crank case 124. The forward end of the guide block is apertured to receive a locking pin 281 which is adapted to be inserted in any one of a number of holes 282 distributed alongside of arcuate slot 277. Connecting rod 280 is thus capable of being pivotally connected to the upper end of arm 275 at various positions along its curved upper end. The purpose of this adjustment will be made apparent at a later point in the description.

The end of arm 280 that projects within the cam box is pivotally connected by means of pin 290 to two side plates 291 which are slidable within a guideway 292 mounted on crank case side wall 293 (see Figs. 8 and 17). This guideway 292 is such as to accommodate necessary vertical swinging of connecting arm 280 between side plates 291. Mounted between plates 291 beyond pivot pin 290 is a mounting block 296, and mounted on the upper and lower ends of said block are rearwardly projecting guide plates 297 and 298, connected at their rearward ends by screw 299 and spacer sleeve 299a. These guide plates 297 and 298 are slidable on the opposite surfaces 300 and 301 of a guide block 302 which is rotatably mounted on main drive shaft 120. Guide block 302 is provided with flanges 304 guiding the edges of plates 297 and 298, as clearly indicated in the drawings.

Carried by a pin 307 mounted in side plates 291, and mounting block 296, between pivot pin 290 and the drive shaft, is a cam follower roller 308 which engages in a cam groove 309 formed in the side of a cam member 310 keyed on guide shaft 120. It will be evident that the assembly comprising plates 291, 297 and 298 forms a cam follower member constrained to movement in a horizontal direction, longitudinally of the machine as the cam is rotated, while connecting rod 280 which is pivotally mounted to that cam follower member swings vertically as it operates pivoted arm 275. As connecting rod 280 is moved forwardly by the cam, arms 275 and 272 are swung in a forward direction to move the bread ram member forwardly to force the loaf through the cutter mechanism, the ram being retracted with reverse movement of the connecting rod.

The parts are so arranged and designed that the center of curvature of arcuate slot 277 in the upper end of swinging arm 275 is substantially coincident with the position of the pivotal connection of connecting rod 280 with cam follower plate 291 when the connecting rod is in its extreme advanced position, said rod having then moved the ram to its extreme position ahead. It will now be evident that with the parts in such position, connecting rod 280 may be moved up or down in slot 277 without moving swinging arms 275 or the ram, and that the extreme advanced position of the ram therefore is independent of the adjustment of the forward end of the connecting rod up or down in said slot. When connecting rod 280 is in its retracted position, however, as shown in Fig. 1, adjustment of the connecting rod up or down in the slot 277 of arm 275 causes said arm to swing somewhat and therefore to adjust the extreme retracted position of the ram. This adjustment feature therefore enables the ram to be adjusted to loaves of different widths simply by inserting locking pin 281 in the proper aperture 282 of swinging arm 275, the adjustment in any given case being made such that the ram retracts only sufficiently far to allow the loaf to be moved up in front of it by the elevator without liability of interference. The advantage of this adjustment is in eliminating of travel of the ram, giving additional time for the slicing operation.

Cam member 310 is so designed and so angularly related to the sustaining plate cam that the ram begins to move forwardly substantially simultaneously with the beginning of forward movement of the sustaining plate and continues to move in a forward direction for substantially 290° of drive shaft rotation, the ram then returning through the retaining 60° of shaft rotation. Consideration of the timing diagram of Fig. 18 will reveal that the elevator lifts the loaf into elevated position immediately that said position is cleared by the quick-returning ram. Sustaining plate 221 has been retracted from its advanced position above the elevator ahead of retraction of the ram, being started rearwardly as soon as the ram has moved the loaf off of it. When the elevator is then in its uppermost position, sustaining plate 221 moves quickly in beneath the loaf, and the bread advancing ram then at once engages the loaf and starts it forwardly on the cutting stroke, while the elevator lowers to receive the next loaf. Thus a comparatively large proportion of the cycle is devoted to moving the loaf through the knives. This is of particular importance and advantage, in that the speed of the entire machine is limited by the time required to move a given loaf through the knives without crushing or production of an excess of crumbs. The machine is operated at such speed that the loaf is moved through the knives by the ram at the maximum speed comparable with accomplishment of a clean cut. It will be evident that by allotting a comparatively large proportion of the cycle to the cutting operation, the possible maximum speed of the machine, or the maximum loaves per minute which can be satisfactorily sliced, is increased. In the present machine, the bread ram advances through substantially four-fifths of the driving cycle and returns through the remaining fifth of the cycle, thus affording an unusually long bread cutting period for any given speed of the machine as a whole. This high ratio of bread slicing time to return motion time is made possible by the provision of the sustaining plate, which permits the elevator to depart from the slicing plane to pick up the next loaf and have it in readiness to be moved to the slicing plane instantly that the quickly returning ram reaches its retracted position.

Attention is directed to the fact that the loaf supporting or sustaining plate 221 is tilted somewhat toward the vertical sliding knives (in the present machine, at an angle of 14°), and that the upper corner or crust of the loaf moved forwardly on plate 221 will therefore engage the knives instead of a flat side of the loaf, which is well known to give a faster and cleaner cut. It is of course possible to modify the machine within the scope of the present invention in such a manner as to cause the sustaining plate to move in a horizontal direction, or to support the loaf in a squarely upright position, and to move the loaf forwardly through the knives in a truly horizontal direction. In such an instance the knives may, if desired, be disposed at such an angle with vertical as to bear the same relation to the loaves as in the present illustrative embodiment of the invention. In other words, if the loaves move forwardly toward the knives in a horizontal direction, supported in a squarely upright position, the knives may be inclined accordingly, so as to engage the upper corner of the advancing loaf rather than a flat side. It will be understood that such a modification involves exactly the same cutting relations between knives and advancing loaves as are present in the instant machine.

The loaf moved by the ram forwardly through the knives slides from sustaining plate 221 onto a stationary supporting plate 320 provided with rearwardly extending fingers 321 which project between cutter knives 202 nearly to the forward edge of sustaining plate 221, when said plate 221 is in advanced position. This plate 320 is disposed in the plane of or very slightly below sustaining plate 221, so that the loaf slides easily onto it as it leaves plate 221, and may be mounted in any suitable manner on the frame of the cutter mechanism.

A vertically adjustable hold-down plate 324 is mounted on the frame of the cutter head, and guides the upper surfaces of the loaves as they are moved through the cutters. This plate is formed with forwardly extending fingers 325 which project between the knives, and which engage the upper surface of the loaf and hold it down during the cutting operation. Plate 324 is shown in Fig. 1 to be provided with a mounting bracket 326 having a vertical slot 327 which receives a clamp screw 328 screw-threaded into the frame of cutter mechanism 25. Plate 324 may be adjusted to loaves of different heights simply by loosening screw 328 and moving bracket 326 up or down as may be required and then resetting the clamp screw.

The bread ram pushes the loaves through the knives over the supporting plate 320 and onto what may be described as a gap-closing plate 330, the extreme advanced position of the ram being indicated in Fig. 18. This plate 330 is slidably supported on the end of a sheet-metal outfeed conveyor plate 331 which as here shown is inclined in a slightly upward direction toward its outgoing end. The longitudinal edges of plate 331 are provided with downturned flanges 332, as shown.

Conveyor plate 331 is supported at its infeed end by means of brackets 333 secured to its flanges 332, said brackets having heads 334 which are removably received in sockets 336 formed in bracket members 335 mounted on the frame of cutter mechanism 25. Plate 331 is supported near its center by means of brackets 337 secured to its flanges 332 and mounted on frame members 22.

At the infeed end of conveyor plate 331 is mounted a horizontal transverse shaft 340 carrying chain sprockets 341 just outside the longitudinal edges of plate 331, said shaft 340 being here shown as journalled in bearings 342 provided by the aforementioned mounting brackets 333 that carry the end of conveyor plate 331. Trained over these sprockets 341 are conveyor chains 343. Shaft 340 and sprockets 341 are so positioned that conveyor chains 343 ride around sprockets 341 a short distance ahead of the end 331a of conveyor plate 331, and travel forwardly at an elevation just above the plane of gap closing plate 330 and conveyor plate 331.

At the other end of conveyor plate 331 these chains 343 pass around sprockets 347 mounted on a drive shaft 348 journaled in bearings 349 carried by plate 331. From sprockets 347, chains 343 are trained downwardly below plate 331, around idler sprockets 349 mounted on brackets 349a supported by flanges 332 of conveyor plate 331, and from there go to the previously described sprockets 341 on shaft 340.

The two conveyor chains 343 which thus travel just outside the longitudinal edges of conveyor plate 331 at an elevation just above the plane of its upper surface, carry transverse bread pusher slats 350, which are so spaced longitudinally of the chains as to engage and carry forwardly on conveyor plate 331 successive sliced loaves as they are received from the cutting mechanism.

The conveyor chains 343 are driven by means of a sprocket 354 mounted on one end of sprocket shaft 348 and driven by a chain 355, which is in turn driven by sprocket 356 mounted on a shaft 357 journaled in frame members 22. Also mounted on shaft 357 is a sprocket 358 which is driven by a chain 359 from a drive sprocket 360 mounted on main drive shaft 120. The sprockets involved in the drive of conveyor chains 343 are of such relative diameters, and as the longitudinal spacing of slats 350 on conveyor chains 343 is such, that after a loaf has been moved through the slicing mechanism and onto plate 330 by bread ram 250, a slat 350 on chains 343 comes upwardly around sprockets 341 at the beginning end of conveyor plate 331 and engages this loaf to move it along the conveyor plate, the timing being such that one slat is provided for each loaf moved through the cutting mechanism.

The function and operation of gap-closing plate 330 on to which the sliced loaf is moved by ram 250 following the slicing operation will now be described. During the time the sliced loaf is being moved onto this plate 330 by the ram, said plate stands in a position closely adjacent the plate 320 that supports the lower side of the loaf while being sliced (see Fig. 18). While plate 330 is standing in such position, it is obviously impossible for a slat 350 to move upwardly around sprockets 341, the space through which the slat would normally move being closed by the forward portion of said plate. Means are accordingly provided for sliding plate 330 a short distance forwardy immediately that the sliced loaf has been deposited thereon, so as to afford sufficient clearance between plates 320 and 330 to allow slats 350 to pass.

For the purpose of so operating plate 330, the following means are provided. Mounted on the underside of plate 330 is a pair of brackets 369a, which slidably engage the parallel edges 365 of a notch 373 cut in the end of plate 331, edges 365 being parallel to the longitudinal direction of the outfeed conveyor plate. Pivotally connected, as at 369, to brackets 369a are the bifurcations 370 and 371 of a bifurcated arm member 372. The shank 374 of this arm is formed with a longitudinal slot 375 which is slidable on a horizontal transversely extending shaft 376 journaled at 377 in suitable bearings carried by the side flanges 332 of conveyor plate 331. The end of arm shank 374 carries a cam follower roller 380, which bears on the periphery of a cam member 381 tightly mounted on shaft 376. The follower roller 380 on arm 372 is held in constant engagement with cam 381 by means of a tension spring 383 connected between the corresponding end of arm 372 and conveyor plate 331. Shaft 376 is rotated by means of a sprocket 384 mounted on its outer end and a chain 385 connecting said sprocket with a sprocket 386 on the previously described shaft 357 which is driven from the main drive shaft of the machine. It will be evident that rotation of shaft 376 and cam 381 will reciprocate arm 372 to move gap-closing plate 330 back and forth on outfeed conveyor plate 331. Cam 381 is so designed that gap-closing plate 330 moves between a position closely adjacent the edge of the plate 320 that sustains the loaf while being moved through the cutter mechanism (Fig. 16), and a position in which plate 330 is retracted sufficiently to permit slats 350 to move upwardly between the edges of plates 320 and 330. The drive ratios between the sprockets driving shaft 376 are such that shaft 376 rotates at one to one ratio with main drive shaft 120. It will be evident therefore that this shaft 376 makes one revolution for each cycle of operation of the machine—that is, one revolution for each loaf sliced. Cam 381 is so positioned that gap-closing plate 330 stands in its advanced position, closely adjacent the edge of plate 320, during the time the loaf is being sliced and is being moved forwardly through the slicer onto said plate 330. Thereafter, ram 250 is quickly retracted rearwardly through the knife blades, and gap-closing plate 330 is moved in an opposite direction to open a gap between its edge 330a and the edge of plate 320. A slat 350 then moves upwardly through the gap so opened and engages the loaf on plate 330 to slide it from plate 330 onto outfeed conveyor plate 331 and thence onward to the outgoing end of said plate, from where it is received by any suitable wrapping machine, not shown. When the loaf has been moved off of gap-closing plate 330, said plate is moved back to its original position adjacent the edge of plate 320 in readiness to receive the next sliced loaf.

The outfeed conveyor plate is shown equipped with side rails 390 adapted to engage and guide the ends of the sliced loaves as they are moved along the conveyor plate by ram slats 350. These rails are suspended from hangers 391 which are horizontally adjustable on supporting cross-bars 392 mounted on standards 393 secured to the side flanges 332 of the outfeed conveyor plate.

Main drive shaft 120 of the machine is driven from any suitable source of power. In the event that the machine is to be operated synchronously with a wrapping machine, drive shaft 120 may be driven from a chain 400, which may be driven by the prime mover that also drives the wrapping machine, or may be driven by the wrapping machine itself. As here indicated, this drive chain 400 drives a sprocket 401 concentric with shaft 120, and a clutch 402, preferably of the nature disclosed in my United States Patent No. 1,975,394 dated October 2, 1934, is employed to drivingly connect sprocket 401 with drive shaft 120. As completely set forth in said patent, this clutch is of such a nature as to be capable of clutching sprocket 401 to shaft 120 in but one position on said shaft. Therefore, if sprocket 401 is driven at one to one ratio with the wrapping machine, there is assurance that when clutch 402 is engaged, the wrapping machine and slicing machine will be interlocked in synchronous relation. Clutch 402 is shown as provided with an operating lever 403 extending to the operator's side of the machine.

While I have now described one preferred specific illustrative embodiment of the invention, it is to be understood that the invention is not limited to the exact illustrative machine as shown and specifically described, but that various changes in design structure and arrangement may be made without departing from the spirit of the present invention or the scope of the appended claims.

I claim:

1. In combination with a slicing mechanism comprising a plurality of power driven slicing blades adapted to have a loaf moved therethrough on a given slicing level, loaf feeding means for feeding an unsliced loaf to a position lower than said slicing level, a movable elevator adapted to receive loaves from said loaf feeding means and to engage the bottom of said loaves, power driven means for moving said elevator to positively elevate the loaves to the slicing level, and a reciprocating ram for pushing a loaf elevated by said elevator through the blades of said slicing mechanism.

2. In combination with a slicing mechanism comprising a plurality of power driven slicing blades adapted to have a loaf moved therethrough on a given slicing level, a gravity infeed conveyor chute extending at a downward inclination and adapted to convey loaves to be sliced to a position lower than said slicing level, a movable elevator adapted to receive loaves from said chute and to positively engage the bottom of said loaves, and power driven means for moving said elevator to positively elevate the loaves to the slicing level, and a reciprocating ram for pushing a loaf elevated by said elevator through the blades of said slicing mechanism.

3. In combination with a slicing mechanism comprising a plurality of substantially vertically movable slicing knives adapted to have a loaf moved therethrough on a given slicing level, a gravity infeed conveyor chute extending at a downward inclination and adapted to convey loaves to be sliced to a position lower than said cutting plane, intermittently advanced conveyor belt means for delivering loaves one at a time from the lower end of said chute, a reciprocating elevator adapted when in its lowermost position to receive a loaf from said conveyor belt means and thereafter to elevate said loaf to said slicing level in a position in front of the knives of said slicing mechanism, and a reciprocating ram for pushing a loaf elevated by said elevator through the knives of said slicing mechanism.

4. In combination with a slicing mechanism comprising a plurality of substantially vertically movable slicing knives adapted to have a loaf moved therethrough on a given slicing level, feeding means for feeding loaves to be sliced to a position lower than said knives, a reciprocating elevator adapted to receive loaves one at a time from said feeding means and to elevate the received loaves to said slicing level in a position in front of said knives and thereafter to return in a downward direction to receive the next loaf from the feeding means, a reciprocating loaf sustaining member adapted to move into position below the loaf on the elevator while the elevator is at the upper end of its stroke and to support the loaf at the slicing level when the elevator lowers, and a reciprocating ram for pushing a loaf supported by said sustaining member through the knives of said slicing mechanism, said reciprocating ram and loaf sustaining member retracting before the elevator rises with the next loaf.

5. In combination with a slicing mechanism comprising a plurality of substantially vertically movable slicing knives adapted to have a loaf moved therethrough on a given slicing level, an infeed conveyor chute extending at a downward inclination and adapted to convey loaves to be sliced to a position lower than said slicing level, intermittently advanced conveyor belt means for delivering loaves one at a time from the lower end of said chute, a reciprocating elevator adapted when in its lowermost position to receive a loaf from said conveyor belt means, said elevator being movable upwardly from said position in a direction substantially at right angles to the direction of travel of the loaves on said conveyor belt means to lift a loaf to said slicing level and to a position in front of said knives, and a reciprocating ram movable in a direction substantially at right angles to the direction of travel of said elevator for pushing the loaf elevated by said elevator through said knives.

6. In combination with a slicing mechanism comprising a plurality of substantially vertically movable slicing knives adapted to have a loaf moved therethrough on a given slicing level, an infeed conveyor chute extending at a downward inclination and adapted to convey loaves to be sliced to a position lower than said slicing level, intermittently advanced conveyor belt means for delivering loaves one at a time from the lower end of said chute, a reciprocating elevator adapted when in its lowermost position to receive a loaf from said conveyor belt means, said elevator being movable upwardly from said position in a direction substantially at right angles to the direction of travel of the loaves on said conveyor belt means to lift a loaf to said slicing level and in a position in front of said knives, and a reciprocating ram for moving loaves elevated by said elevator horizontally through said knives.

7. In combination with a slicing mechanism comprising a plurality of substantially vertically movable slicing knives adapted to have a loaf moved therethrough on a given slicing level, an infeed conveyor chute extending at a downward inclination and adapted to convey loaves to be sliced to a position lower than said slicing level, intermittently advanced conveyor belt means for delivering loaves one at a time from the lower end of said chute, a reciprocating elevator adapted when in its lowermost position to receive a loaf from said conveyor belt means, said elevator being movable upwardly from said position in a direction substantially at right angles to the direction of travel of the loaves on said conveyor belt means to lift a loaf to said slicing level and to a position in front of said knives, a reciprocating bread sustaining member adapted to move in a direction towards the knives into position below the loaf on the elevator while the elevator is at the upper end of its stroke and to support the loaf at said slicing level when the elevator lowers, and a reciprocating ram for pushing a loaf supported by said sustaining member through the knives of said slicing mechanism, said reciprocating ram and bread sustaining member retracting before the elevator rises with the next loaf.

8. In combination with a slicing mechanism comprising a plurality of substantially vertically movable slicing knives adapted to have a loaf moved therethrough on a given slicing level, an infeed conveyor chute extending at a downward inclination and adapted to convey loaves to be sliced to a position lower than said slicing level, intermittently advanced conveyor belt means for delivering loaves one at a time from the lower end of said chute, a reciprocating elevator adapted when in its lowermost position to receive a loaf from said conveyor belt means, said elevator being movable upwardly from said position in a direction substantially at right angles to the direction of travel of the loaves on said conveyor belt means to lift a loaf to said slicing level to a position in front of said knives, a reciprocating bread sustaining member adapted to move in a direction towards the knives into position below the loaf on the elevator while the elevator is at the upper end of its stroke and to support the loaf at said slicing level when the elevator lowers, and a reciprocating ram movable in a direction substantially at right angles to the direction of elevator movement.

9. In combination with a slicing mechanism comprising a plurality of substantially vertically movable slicing knives adapted to have a loaf moved therethrough on a given slicing level, an infeed conveyor chute extending at a downward inclination and adapted to convey loaves to be sliced to a position lower than said slicing level, intermittently advanced conveyor belt means for delivering loaves one at a time from the lower end of said chute, a reciprocating elevator adapted when in its lowermost position to receive a loaf from said conveyor belt means, said elevator being movable upwardly from said position in a direction substantially at right angles to the direction of travel of the loaves on said conveyor belt means to lift a loaf to and above said slicing level to a position in front of said knives, a reciprocating bread sustaining member adapted to move toward the knives in a direction substantially at right angles to the direction of elevator movement into position below the loaf on the elevator while the elevator is at the upper end of its stroke and to support the loaf at said slicing level when the elevator lowers, and a reciprocating ram for moving the loaf supported by the sustaining member in tilted relation to the knives toward and through said knives, whereby an upper corner of the loaf first engages the knives, said reciprocating ram and bread sustaining member retracting before the elevator rises with the next loaf.

10. In combination with a slicing mechanism comprising a plurality of substantially vertically moving slicing knives adapted to have a loaf moved therethrough on a given slicing level, an infeed conveyor chute extending at a downward inclination and adapted to convey loaves to be sliced to a position lower than said slicing level, intermittently advanced conveyor belt means for delivering loaves one at a time from the lower end of said chute in a downwardly inclined direction, a reciprocating elevator adapted when in its lowermost position to receive a loaf from said conveyor belt means, said elevator being movable upwardly from said position in a direction substantially at right angles to the direction of travel of the loaves on said conveyor belt means to lift a loaf to and above said slicing level to a position in front of said knives, a reciprocating bread sustaining member moving in a direction at right angles to the direction of elevator movement while the elevator is at the upper end of its stroke and to support the loaf at said slicing level while the elevator lowers, a reciprocating ram movable in a direction substantially at right angles to the direction of elevator movement to push the loaf supported on said sustaining member through the knives of said slicing mechanism, said reciprocating ram and bread sustaining member retracting before the elevator rises with the next loaf.

11. In combination with a slicing mechanism comprising a plurality of substantially vertically moving slicing knives adapted to have a loaf moved therethrough on a given slicing level, an infeed conveyor chute extending at a downward inclination and adapted to convey loaves to be sliced to a position lower than said slicing level, intermittently advanced conveyor belt means for delivering loaves one at a time from the lower end of said chute in a downwardly inclined direction, a reciprocating elevator adapted when in its lowermost position to receive a loaf from said conveyor belt means, said elevator being movable upwardly from said position in a direction substantially at right angles to the direction of travel of the loaves on said conveyor belt means to lift a loaf to and above said slicing level to a position in front of said knives, a reciprocating bread sustaining member adapted to move in a direction towards the knives into position below the loaf on the elevator while the elevator is at the upper end of its stroke and to support the loaf of said slicing level when the elevator lowers, and a reciprocating ram for pushing a loaf supported by said sustaining member through the knives of said slicing mechanism, said reciprocating ram and bread sustaining member retracting before the elevator rises with the next loaf.

12. In combination with a slicing mechanism comprising a plurality of substantially vertically moving slicing knives adapted to have a loaf moved therethrough on a slicing level, means for feeding a loaf to be sliced to a position lower than said slicing level, an elevator movable between a lower position at the delivery end of said loaf feeding means, in which it receives loaves one at a time from said feeding means, and an uppermost position in which it supports a loaf in front of said knives, a loaf sustaining member movable to and from an advanced position over said elevator, and adapted when moved to said advanced position while the elevator is in its uppermost position to take a position below the loaf on said elevator and to support the loaf at said slicing level when the elevator lowers, and a reciprocating ram for pushing a loaf supported on said sustaining member through the knives of said slicing mechanism, a main drive member, means driven by said main drive member operating said ram to move relatively slowly while advancing the loaf through the knives and to return with relatively fast motion in such manner that a relatively large proportion of the operating cycle is devoted to moving the loaf through the knives, means driven by said main drive member in timed relation with the drive of the ram for raising the elevator to its uppermost position just following return motion of the ram, said means causing the elevator to dwell a relatively short time in said uppermost position, then lowering the elevator to its lowermost position and causing the elevator to dwell in its lowermost position sufficiently long for a loaf to be delivered thereon from the feeding means conveyor, and means driven from said main drive member in timed relation with the elevator and ram for quickly advancing the sustaining member as the elevator reaches its uppermost position, and retracting the sustaining member after the loaf has been moved off of it by the ram but not later than the time of retraction of the ram.

13. In combination with a slicing mechanism comprising a plurality of substantially vertically moving slicing knives adapted to have a loaf moved therethrough on a given slicing level, means for feeding loaves to be sliced to a position lower than said slicing level, an elevator movable between a lower position at the delivery end of said feeding means, in which it receives loaves one at a time from said feeding means, and an uppermost position in which it supports a loaf in front of said knives, a loaf sustaining member movable to and from an advanced position over said elevator, and adapted when moved to said advanced position while the elevator is in its uppermost position to take a position below the loaf on said elevator and to support the loaf at said slicing level when the elevator lowers, and a reciprocating ram for pushing a loaf supported on said sustaining member through the knives of said slicing mechanism, a main drive member means involving a cam driven by said main drive member operating said ram to move relatively slowly while advancing the loaf through the knives and to return with relatively fast motion in such manner that a relatively large proportion of the operating cycle is devoted to moving the loaf through the knives, means involving a second cam driven by said main drive member in timed relation with the drive of the ram for raising the elevator to its uppermost position just following return motion of the ram, said second cam causing the elevator to dwell a relatively short time in said uppermost position, then lowering the elevator to its lowermost position and causing the elevator to dwell in its lowermost position sufficiently long for a loaf to be delivered thereon from the feeding means, and means involving a third cam driven from said main drive member in timed relation with the elevator and ram for quickly advancing the sustaining member as the elevator reaches its uppermost position, and retracting the sustaining member after the loaf has been moved off of it by the ram but not later than the time of retraction of the ram.

14. In combination with a slicing mechanism comprising a plurality of substantially vertically movable slicing knives adapted to have a loaf moved therethrough on a slicing level, an infeed chute extending at a downward inclination and adapted to convey loaves to be sliced to a position lower than said slicing level, intermittently advanced conveyor belt means for delivering loaves one at a time from the lower end of said chute, an elevator movable between a lower position in which it receives loaves one at a time from the advancing belt conveyor, and an uppermost position in which it supports a loaf in front of said knives, a loaf sustaining member movable to and from an advanced position over said elevator, and adapted when moved to said advanced position while the elevator is in its uppermost position to take a position below the loaf on said elevator and to support the loaf at said slicing level when the elevator lowers, and a reciprocating ram for pushing a loaf supported on said sustaining member through the knives of said slicing mechanism, a main drive member, means driven by said main drive member operating said ram to move relatively slowly while advancing the loaf through the knives and to return with relatively fast motion in such manner that a relatively large proportion of the operating cycle is devoted to moving the loaf through the knives, means driven by said main drive member in timed relation with the drive of the ram for raising the elevator to its uppermost position just following return motion of the ram, said means causing the elevator to dwell a relatively short time in said uppermost position, then lowering the elevator to its lowermost position and causing the elevator to dwell in its lowermost positions for an interval of time, means driven from said main drive member in timed relation with the elevator and ram for quickly advancing the sustaining member as the elevator reaches its uppermost position, and retracting the sustaining member after the loaf has been moved off of it by the ram but not later than the time of retraction of the ram, and means driven by said main drive member for advancing said belt conveyor by a distance equal to substantially one loaf width each time the elevator is in its lower position.

15. In combination with a slicing mechanism comprising a plurality of substantially vertically movable slicing knives adapted to have a loaf moved therethrough on a slicing level, an infeed chute extending at a downward inclination and adapted to convey loaves to be sliced to a position lower than said knives, intermittently advanced conveyor belt means for delivering loaves one at a time from the lower end of said chute, an elevator movable between a lower position in which it receives loaves one at a time from the advancing belt conveyor, and an uppermost position in which it supports a loaf in front of said knives, a loaf sustaining member movable to and from an advanced position over said elevator, and adapted when moved to said advanced position while the elevator is in its uppermost position to take a position below the loaf on said elevator and to support the loaf at said slicing level when the elevator lowers, a reciprocating ram for pushing a loaf supported on said sustaining member through the knives of said slicing mechanism, a main drive member, means driven by said main drive member operating said ram to move relatively slowly while advancing the loaf through the knives and to return with relatively fast motion in such manner that a relatively large proportion of the operating cycle is devoted to moving the loaf through the knives, means driven by said main drive member in timed relation with the drive of the ram for raising the elevator to its uppermost position just following return motion of the ram, said means causing the elevator to dwell a relatively short time in said uppermost position, then lowering the elevator to its lowermost position and causing the elevator to dwell in its lowermost position for an interval of time, means driven from said main drive member in timed relation with the elevator and ram for quickly advancing the sustaining member as the elevator reaches its uppermost position, and retracting the sustaining member after the loaf has been moved off of it by the ram but not later than the time of retraction of the ram, and an operative interconnection between said main drive member and the belt conveyor including an arm reciprocated by said main drive member and a ratchet clutch adapted to transmit motion when said reciprocating arm is moving in one direction of travel, said arm being driven by said main drive shaft in such timed relation with the elevator that the belt conveyor is advanced each time the elevator is in its lower position.

16. In combination with a slicing mechanism comprising a plurality of substantially vertically moving slicing knives adapted to have a loaf moved therethrough on a given slicing level, means for feeding loaves to be sliced to a position lower than said slicing level, an elevator movable between a lower position at the delivery end of said conveyor, in which it receives loaves one at a time from the feeding means, and an uppermost position in which it supports a loaf in front of said knives, a loaf sustaining member movable to and from an advanced position over said elevator, and adapted when moved to said advanced position while the elevator is in its uppermost position to take a position below the loaf on said elevator and to support the loaf at said slicing level when the elevator lowers, and a reciprocating ram for pushing a loaf supported on said sustaining member through the knives of said slicing mechanism, a main drive member, means driven by said main drive member operating said ram to move relatively slowly while advancing the loaf through the knives and to return with relatively fast motion in such manner that a relatively large proportion of the operating cycle is devoted to moving the loaf through the knives, said last mentioned means being adjustable to regulate the back stroke limit of the ram to suit different loaf widths and to avoid unnecessary over movement of the ram on the back stroke, means driven by said main drive member in timed relation with the drive of the ram for raising the elevator to its uppermost position just following return motion of the ram, said means causing the elevator to dwell a relatively short time in said uppermost position, then lowering the elevator to its lowermost position and causing the elevator to dwell in its lowermost position sufficiently long for a loaf to be delivered thereon from the infeed conveyor, and means driven from said main drive member in timed relation with the elevator and ram for quickly advancing the sustaining member as the elevator reaches its uppermost position, and retracting the sustaining member after the loaf has been moved off of it by the ram but not later than the time of retraction of the ram.

17. In combination with a slicing mechanism comprising a plurality of substantially vertically movable slicing knives adapted to have a loaf moved therethrough on a given slicing level, means for feeding loaves to be sliced to a position lower than said slicing level, a reciprocating elevator adapted to receive loaves one at a time from said feeding means and to elevate the received loaves to a position in front of said knives, and thereafter to return in a downward direction to receive the next loaf from the conveyor, said elevator comprising a plurality of vertically disposed horizontally spaced plates running longitudinally of the direction of travel of the loaves coming from the feeding means, a reciprocating loaf sustaining member comprising a plurality of horizontally spaced forwardly projecting fingers movable forwardly under the loaf while the elevator is in its uppermost position, with its fingers moving in between the vertical loaf supporting plates of the elevator, said fingers being adapted to receive and support the loaf at said slicing level when the elevator lowers, and a reciprocating ram for pushing a loaf supported by said fingers forwardly toward and through the knives of the slicing mechanism, said reciprocating ram and the bread sustaining member retracting before the elevator rises with the next loaf.

18. In combination with a slicing mechanism comprising a plurality of substantially vertically movable slicing knives adapted to have a loaf moved therethrough on a given slicing level, an infeed chute extending at a downward inclination and adapted to convey loaves to be sliced to a position lower than said slicing level, a reciprocating elevator movable in a direction substantially at right angles to the direction at which loaves are delivered from said conveyor between a lower position in which it receives loaves, one at a time, from said conveyor and an upper position in which the loaf is supported in front of the knives, a depending apron on said elevator extending substantially parallel to the direction of elevator travel and acting as a stop at the end of the conveyor while the elevator is above its lowermost position to prevent loaves from falling from the end of the conveyor at such time, and means for moving a loaf elevated by the elevator through the slicing knives.

19. In combination with a slicing mechanism comprising a plurality of substantially vertically movable knives adapted to slice a loaf or the like, means for feeding loaves in timed sequence toward and through said knives, a plate for supporting the lower side of the loaf while passing through said knives, an outfeed conveyor plate, one end of which is spaced from the adjacent edge of said supporting plate, a reciprocating gap closing plate movable on the same end of the conveyor plate to alternately open and close the gap between the edge of the supporting plate and the end of the conveyor plate, a pair of conveyor chains movable along the longitudinal edges of the conveyor plate, a series of bread moving slats carried by and between said chains and movable above said conveyor plate to slide the sliced loaves therealong, sprockets for said chains so positioned that said slats rise through the intermittently opened gap between the end of the conveyor plate and the edge of said supporting plate, and means for driving said chains in such timed relation with the reciprocation of said gap closing plate that a slat on said chains rises around said sprockets each time the gap is opened by the reciprocating gap closing plate.

20. In combination with a slicing mechanism comprising a plurality of substantially vertically movable knives adapted to slice a loaf or the like, a reciprocating ram for moving loaves in timed sequence toward and through said knives, a plate for supporting the lower side of the loaf while passing through said knives, an outfeed conveyor plate, one end of which is spaced from the adjacent edge of said supporting plate, a reciprocating gap closing plate movable on the same end of the conveyor plate to alternately open and close the gap between the edge of the supporting plate and the end of the conveyor plate, a pair of conveyor chains movable along the longitudinal edges of the conveyor plate, a series of bread moving slats carried by and between said chains and movable above said conveyor plate to slide the sliced loaves therealong, sprockets for said chains so positioned that said slats rise through the intermittently opened gap between the end of the conveyor plate and the edge of said supporting plate, means operated in timed sequence with said ram for moving said reciprocating gap closing plate to open the gap each time a sliced loaf is moved onto said plate by said ram, and means for driving said chains at such speed that a bread moving slat moves upwardly around said sprockets each time said gap is opened by said reciprocating plate.

21. In combination with a plurality of power driven slicing blades arranged to have a loaf fed therethrough along a predetermined slicing path, feed means for feeding loaves to a position below said slicing path, hold-down means located in close proximity to and in front of said slicing blades and extending approximately across the upper boundary of said slicing path, elevator mechanism adapted to receive a loaf from said feed means at said position below said slicing path and to positively raise said loaf to a position in said slicing path in front of said blades and below said hold-down means, and a reciprocating ram for feeding said loaf from its last said position through said power driven slicing blades along said slicing path.

22. In combination with a plurality of power driven slicing blades arranged to have a loaf fed therethrough along a predetermined slicing path, feed means adapted to discharge unsliced loaves at a position in front of said slicing blades but vertically out of line with said slicing path, a loaf carrier platform adapted to come to rest at the discharge point of said feed means to receive unsliced loaves from said feed means, said loaf carrier platform being inclined downwardly in the direction that loaves are fed thereon from said feed means so that gravity aids in sliding the unsliced loaves completely onto said carrier platform as they are received from said feed means, means for moving said carrier platform to transfer said loaves from said place where the carrier platform receives them to a position in line with said slicing path, and a reciprocating ram for pushing the loaf from its last said position through said slicing blades along said slicing path.

23. In combination with a plurality of power driven slicing blades arranged to have a loaf fed therethrough along a prdetermined slicing path, feed means adapted to discharge unsliced loaves at a position in front of said slicing blades but below said slicing path, a loaf carrier adapted to come to rest at the discharge point of said feed means, said loaf carrier being downwardly inclined in the direction that loaves are fed thereon from said feed means so that gravity aids received loaves in passing onto said loaf carrier, power driven means for raising and lowering said loaf carrier, the said carrier being adapted to positively raise said loaf to a position in close proximity to said slicing blades and in line with said slicing path, and a reciprocating ram for pushing a loaf elevated by said loaf carrier through said slicing blades along said slicing path.

24. In combination with a plurality of power driven slicing blades arranged to have loaves fed therethrough along a downwardly inclined slicing path, loaf feeding means for conveying loaves to a position vertically out of line with said slicing path, a reciprocating loaf carrier downwardly inclined in the direction that loaves are fed thereon, said carrier being adapted to receive a loaf from said loaf feeding means at said position out of line with said slicing path and to move said loaf to a position in front of and close to said blades and in line with said slicing path, and a reciprocating feeder ram adapted on its feeding stroke to move along a downwardly inclined path to push the loaf from its last said position through said blades along said downwardly inclined slicing path.

25. In combination with a plurality of power driven slicing blades adapted to have loaves fed therethrough along a downwardly inclined slicing path, loaf feeding means for conveying loaves to a position below said slicing path, a hold-down member mounted in front of and in close proximity to said slicing blades and approximately across said slicing path, a power driven elevator adapted to receive a loaf from said loaf feeding means at said position below said slicing path and to elevate said loaf to a position in front of and close to said slicing blades and immediately below said hold-down member, and a reciprocating feeder ram adapted on its feeding stroke to move along a downwardly inclined path to push the loaf from its last said position through said blades along said downwardly inclined slicing path.

26. In combination with a plurality of power driven slicing blades arranged to have a loaf fed therethrough along a given slicing path, feeding means for feeding loaves to be sliced to a position lower than said slicing path, movable elevator mechanism adapted to receive a loaf from said feeding means and to elevate the received loaf to a position close to and in front of said slicing blades, movable loaf sustaining means adapted to move into loaf sustaining position when the loaf is approximately in its last described position and to sustain the loaf there while said elevator mechanism returns downwardly to receive another loaf from said feeding means, and means for feeding the loaf from its position as sustained by said loaf sustaining means through said slicing blades along said slicing path.

27. In combination with a slicing mechanism comprising a plurality of power driven slicing blades adapted to have a loaf fed therethrough along a given slicing path, feeding means for feeding an unsliced loaf to a position lower than said slicing path, a movable elevator adapted to receive loaves from said feeding means, power driven means for moving said elevator to positively elevate the loaves to a position approximately in said slicing path, and reciprocating mechanism including means for sustaining the loaf in said slicing path and means for pushing the sustained loaf through the blades while said elevator returns downwardly to receive another loaf from said feeding means.

WILLIAM WALTER HARTMAN.

CERTIFICATE OF CORRECTION.

Patent No. 2,106,949. February 1, 1938.

WILLIAM WALTER HARTMAN.

It is hereby certified that error appears in the printed specification of the above numbered patent requiring correction as follows: Page 13, second column, line 3, claim 26, strike out the words "close to and"; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.